US008694751B2

(12) United States Patent
Siegwart et al.

(10) Patent No.: US 8,694,751 B2
(45) Date of Patent: Apr. 8, 2014

(54) DEFER SEPARATING CHILDREN IN PARALLEL COPYING GARBAGE COLLECTION

(75) Inventors: David Kevin Siegwart, Eastleigh (GB); Nikola Grcevski, Toronto (CA); Daryl James Maier, Unionville (CA); Ryan Andrew Sciampacone, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 967 days.

(21) Appl. No.: 12/347,256

(22) Filed: Dec. 31, 2008

(65) Prior Publication Data

US 2010/0169593 A1    Jul. 1, 2010

(51) Int. Cl.
*G06F 13/00*    (2006.01)
(52) U.S. Cl.
USPC .................... 711/170; 711/162; 711/E12.012
(58) Field of Classification Search
USPC ........................................... 711/162, E12.012
See application file for complete search history.

(56) References Cited

U.S. PATENT DOCUMENTS

| 6,321,240 | B1 | 11/2001 | Chilimbi et al. |
| 6,427,154 | B1* | 7/2002 | Kolodner et al. ...................... 1/1 |
| 6,529,919 | B1* | 3/2003 | Agesen et al. ......................... 1/1 |
| 7,421,539 | B1* | 9/2008 | Seidl et al. ..................... 711/133 |
| 7,653,793 | B1* | 1/2010 | Garthwaite .................... 711/159 |
| 2002/0087563 | A1* | 7/2002 | Ghemawat et al. ............ 707/100 |
| 2008/0005520 | A1 | 1/2008 | Siegwart et al. |
| 2010/0031270 | A1* | 2/2010 | Wu et al. ....................... 718/107 |

* cited by examiner

*Primary Examiner* — Sean D Rossiter
(74) *Attorney, Agent, or Firm* — Yee & Associates, P.C.; David A. Mims, Jr.

(57) ABSTRACT

Automatic memory management with a generational copy collector garbage collection algorithm running on parallel threads to perform simultaneous and independent copying and scanning. An object is scanned. It is determined whether an object referenced within the slot of the object being scanned may be copied to the same generation as the scanned object. A mark may be made to indicate that the referenced object may be copied to a different generation than the scanned object. The mark defers the copying of the referenced object.

9 Claims, 9 Drawing Sheets

DEFER SEPARATING CHILDREN IN PARALLEL COPYING GARBAGE COLLECTION

BACKGROUND

1. Field of the Invention

The present disclosure relates generally to automatic memory management and more specifically to a generational garbage collection technique that optimizes the locality of objects in memory.

2. Description of the Related Art

Improving memory data locality in systems contributes to optimized performance of applications. The performance of an application being executed is enhanced when data or objects being used by the application may be easily accessed by the system. It is optimum for objects or data that may be accessed frequently or close in time to be located within the same memory space, such as the same cache line or cache page.

There are many different types of garbage collection algorithms, but only the garbage collection algorithm that copy or move objects may be helpful improving the locality of objects in a memory. For example, a copying garbage collector moves objects from one area or space in memory to another. A copying garbage collector may improve locality by searching for data, collecting all the live objects in one area or heap of memory, and copying the live objects to another area of memory to compact the location of live objects into one space.

Hierarchical copying garbage collection improves locality by co-locating objects that are hierarchically related. Hierarchically related objects are those that are directly or indirectly connected to each other via references between them. For instance, parents, children, siblings, cousins, grandparents and grandchildren are all hierarchically related. It relies on empirical evidence that objects that are used close in time are often hierarchically related to one another. Parallel hierarchical copying garbage collection further improves locality by allowing multi-threaded compaction operations within a memory. Further details that illustrate how parallel hierarchical copying garbage collection improve locality and improve system performance are disclosed in U.S. patent application Ser. No. 11/450,946 to Siegwart et al., entitled "Locality With Parallel Hierarchical Copying Garbage Collection," filed Jun. 9, 2006 and incorporated herein for all purposes. In the Siegwart et al. patent application, the parallel hierarchical copying garbage collection algorithm is generational. However, even in parallel hierarchical copying algorithms, there may be cases that compromise or defeat optimum locality where children of an object are copied outside the space or locality of the object.

In one example, during a copying garbage collection, a live object in the allocation space of a heap may be referenced. The object may be scavenged or copied from the allocation space of the heap to the survivor space. In the survivor space, the slots of the copied parent object may be scanned and the possibility exists that the children referenced in each of the slots of the parent object may be not be copied into the same space as the parent object. Rather, the children may be separated into a space of memory based on their generation or age.

For example, if a child is considered young, it may be copied into the survivor space along with the parent object. If a child of the object is old, it may be separated from the parent object and copied into the tenure region of memory, because of its age. The tenure region may be orders of magnitude of the cache line size or page size away from the survivor region. Therefore, good locality of the old child to the parent object may be defeated. A child of a different generation from its parent object may not achieve good locality with the parent object because it may be separated from the parent object into a different space.

BRIEF SUMMARY

This disclosure describes a new approach to achieving locality in memory of objects during hierarchical scanning of objects. A parent object and a child referenced by that object may not belong to the same generation. The copying of the child may be deferred to allow the processor to determine whether it may be beneficial for the child to be co-located in the same space as the parent or co-located in another space corresponding to another object that may reference the child.

According to an embodiment of the current disclosure, a computer-implemented method of automatic memory management in a multi-threaded processor is disclosed. The method comprises scanning a slot of an object; responsive to the scanning, determining a destination region to which an object referenced within the slot of the object is to be copied; and deferring a copying of the referenced object.

According to another embodiment, there is disclosed a computer-implemented method of automatic memory management in a multi-threaded processor. The method comprising scanning a slot of an object; determining a frequency of use of an object referenced within the slot; and responsive to a determined frequency of use that is minimal, deferring a copying of the referenced object in the slot.

According to one embodiment of the present disclosure, an automatic memory management system is disclosed. The system comprises a multi-threaded processor, wherein each thread of the processor is synchronized to perform work to be processed for a copying garbage collector. The processor includes memory that comprises means for each thread of the processor to process a workpacket comprising objects; means for scanning a slot of an object in the workpacket; means for determining whether an object referenced within the slot is to be copied to a destination region of the object in the workpacket; means for deferring a copying of the referenced object; and means for rescanning the workpacket.

According to one embodiment, the disclosure provides a computer program product comprising a computer-recordable medium tangibly embodying instructions which, when executed by a computer, performs actions of scanning a slot of an object; responsive to the scanning, determining a destination region to which an object referenced within the slot is to be copied; and deferring a copying of the referenced object.

These and other advantages will be more clearly understood from the following detailed description taken in conjunction with the accompanying drawings and claims.

DETAILED DESCRIPTION

The present disclosure is described below with reference to flowchart illustrations and may include one or more block diagrams of methods, apparatuses, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As will be appreciated by one skilled in the art, the present disclosure may be embodied as a system, method, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present disclosure may take the form of a computer program product embodied in any tangible medium of expression having computer usable program code embodied in the medium. The present disclosure should in no way be limited to the illustrative implementations, drawings and techniques described herein, but may be modified within the scope of the appended claims along with their full scope of equivalents.

Figure 1:
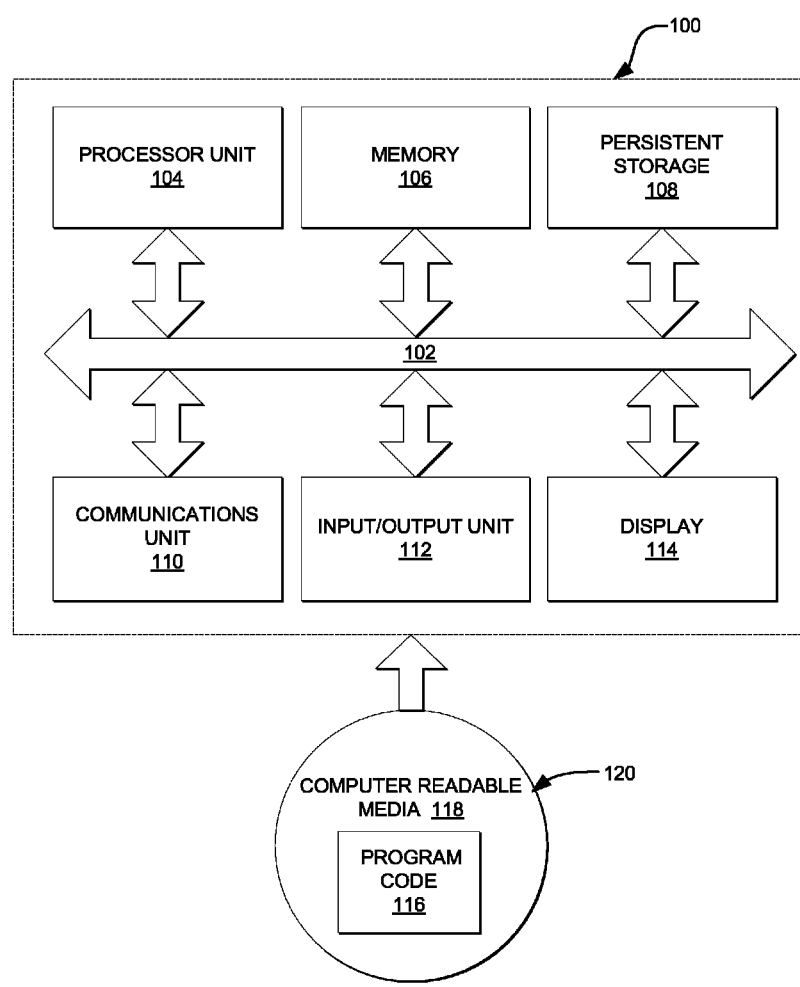
FIG. 1 is a block diagram of an exemplary software environment that may be operable for various embodiments of the disclosure.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108. Embodiments of the disclosure may be implemented by software including, but not limited to Java™, C++, Pascal, or any other functional programming language that is used for automatic memory management as would be obvious to one skilled in the art.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one embodiment, computer readable media 118 may exist in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, or transmission-type media, such as communications links or wireless transmissions containing the program code.

In some illustrative embodiments, program code 116 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 116 may be a server computer, a client computer, or some other device capable of storing and transmitting program code 116.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

In this disclosure, the following definitions may be applicable:

Allocation Space: a region in which objects are allocated. At garbage collection time it contains both live and dead objects; at this time the space occupied by dead objects is ready to be reused. During garbage collection, live or reachable objects are scavenged or copied from the allocation region.

Flipped: copied from the allocate region into the survivor region.

Freelist: When referring to the heap, the list of free areas in memory i.e. non-contiguous regions in a heap not yet allocated. When referring to workpackets, the list of workpackets that are no longer in use, and are available for reuse. When a workpacket is added to the freelist, the objects it refers to are still in use and live, however the workpacket is no longer required to refer to them.

Heap: The memory space in which objects reside.

Parent Object: An object that holds references to one or more other objects.

Nursery: the combination of the survivor space and the allocation space.

Scanlist: a queue of work with objects that need to be scanned.

Scan Alias block: A block of memory that permits dual modes of scanning and copying.

Slot: Any reference to an object within another object.

Survivor space: a coarse grained contiguous region of memory on the order of about 100 MB or more to which live objects may be copied during garbage collection. The survivor space includes blocks of objects that have been copied and are ready to be scanned.

Tenure space: a coarse grained region of memory on the order of about 100 MB or more into which live objects that are old or long-lived are copied.

Workpacket: a memory partition construct that represents a contiguous block of objects that comprises object references. Each object reference is a pointer to an address location in memory. A workpacket may either be a copy block or a scan block or both.

A multi-threaded processing system runs a generational copying garbage collection algorithm that scans and copies all objects to achieve an optimum locality in memory. During garbage collection, a thread may copy a parent object from one space in memory to another. The slots of the object may be scanned and the children referenced in the object are copied. If there is a child of the object that is not within the same generation as the object being scanned, copying of the child may be deferred until a later time.

FIG. 2 illustrates an exemplary top-level embodiment that includes a sequence, FIGS. 2A-2E, detailing the processing of a parent object with a deferred separating child. FIGS. 2A-2E illustrate a generational type of memory 200, collectively the heap, that includes a nursery region 206 and a tenure region 208. Nursery region 206 is composed of two semi-spaces, allocation space 202, and survivor space 204. The regions and the spaces of memory 200 may include a number of live objects and dead objects that are parent objects. It must be understood that the number and type of objects illustrated in the figures are for exemplary purposes only. The type and number of objects will depend on the system and application involved. Similarly it must be understood other embodiments may exhibit a different number or type of regions.

Figure 2A:
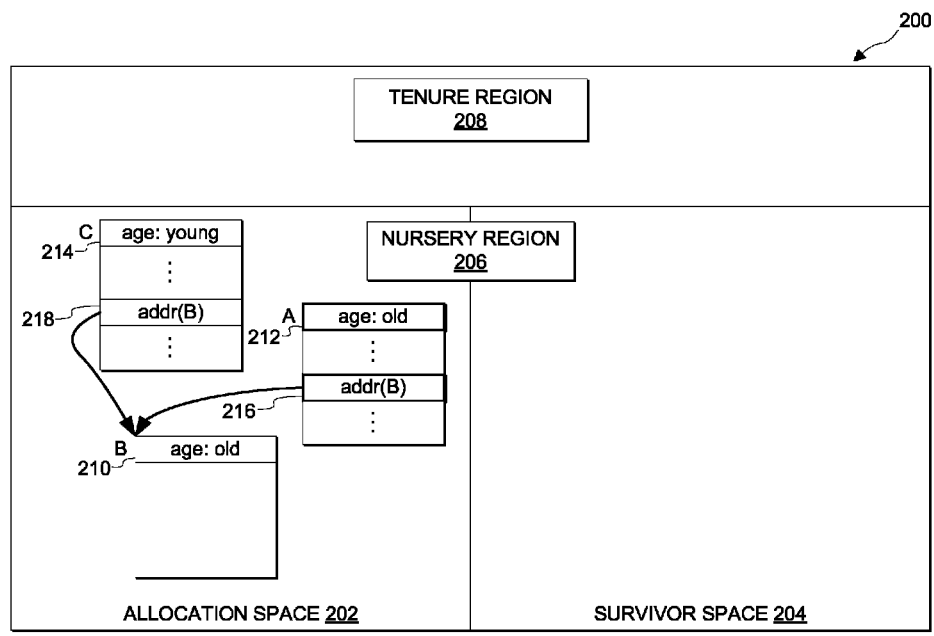
FIGS. 2A, 2B, 2C, 2D, and 2E illustrate a sequence in a copying garbage collection routine in accordance with an embodiment of the disclosure.

FIG. 2A illustrates three live objects, object A 212, object B 210, and object C 214 located in allocation space 202 of memory 200. The number of objects in allocate space 202 is not in any way limited to three and may, in fact, include a plurality of other live objects and dead objects that are not shown. The objects may be of a certain age depending on system configuration. In this example, object A 212 may be considered an old object, object B 210 may be determined to be an old object, and object C 214 may be considered as a young object. The objects may include a plurality of slots that reference other objects. For example, object A 212 may include slot 216 that references or includes a pointer to object B 210. Similarly, object C 214 may include a slot 218 that also includes a reference or pointer to object B 210.

Figure 2B:
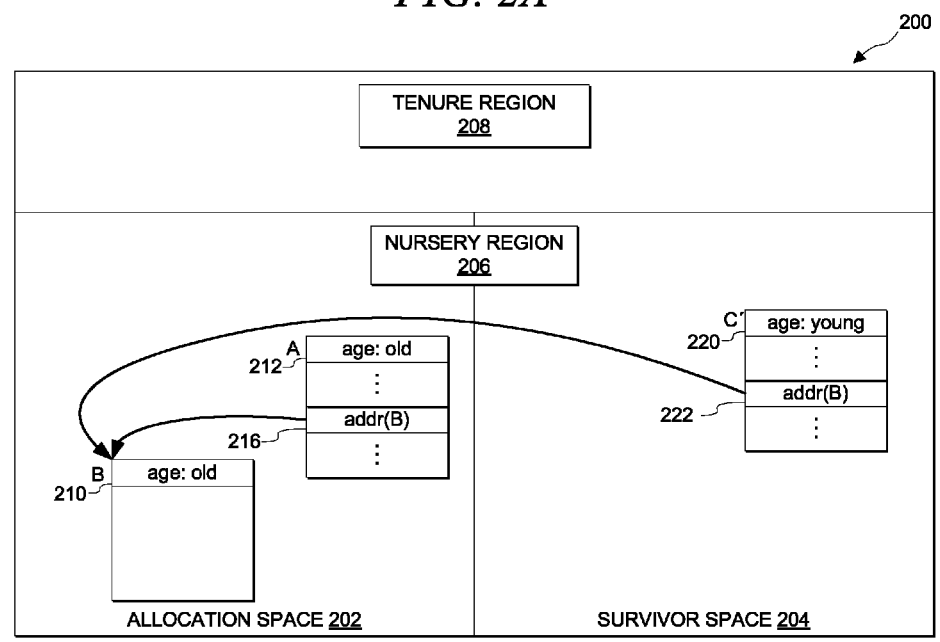

The copying garbage collection algorithm may be executed by a thread of the system and operate to scavenge or copy the live objects of allocate space 202 to survivor space 204 or to tenure space 208. The survivor space 204 and the tenure space 208 may also be individually referred to as destination regions that receive objects that are copied during garbage collection. For example, object C 214 may be referenced by an object that is live. Therefore, object C 214 is copied out of allocation space 202. Object C 214 is denoted as being a young object. Therefore, it will be copied or flipped from allocation space 202 into the other semi-space of nursery 206, survivor space 204. FIG. 2B illustrates object C 214 of FIG. 2A, having been copied into survivor space 204, as object C' 220. Object C' 220 may still reference or include slots to a plurality of other objects including the reference slot 222 to object B 210 in allocation space 202.

The processor thread scans the slots of object C' 220 and the ages of the objects referenced in the slots of object C' 220 are recorded. If an age of an object referenced in C' 220 is the same as object C' 220, then the referenced object may be copied into the same space as object C' 220 in close proximity with object C' 220. During the scan of object C' 220, it may be noted that at least one object referenced by object C' in slot 222 has an age that is different from object C' 220. For example, the reference to object B 210 in allocate space 202 may be scanned at slot 222 of object C' 220 and it may be noted that object B 210 is an old object. Object B 210 will be considered a separating child since it will be copied, based on its old age, to the tenure region 208 outside of close locality to object C' 220. The processor thread may defer the copying of the referenced object B 210 to determine whether there is another object that may reference object B 210 and require a close locality with object B 210. Deferring the copying of referenced object B 210 may be implemented by placing an indicator, such as a flag or a mark, on the parent object C' 220 to indicate to the processor thread that the object C' 220 may require rescanning.

Figure 2C:
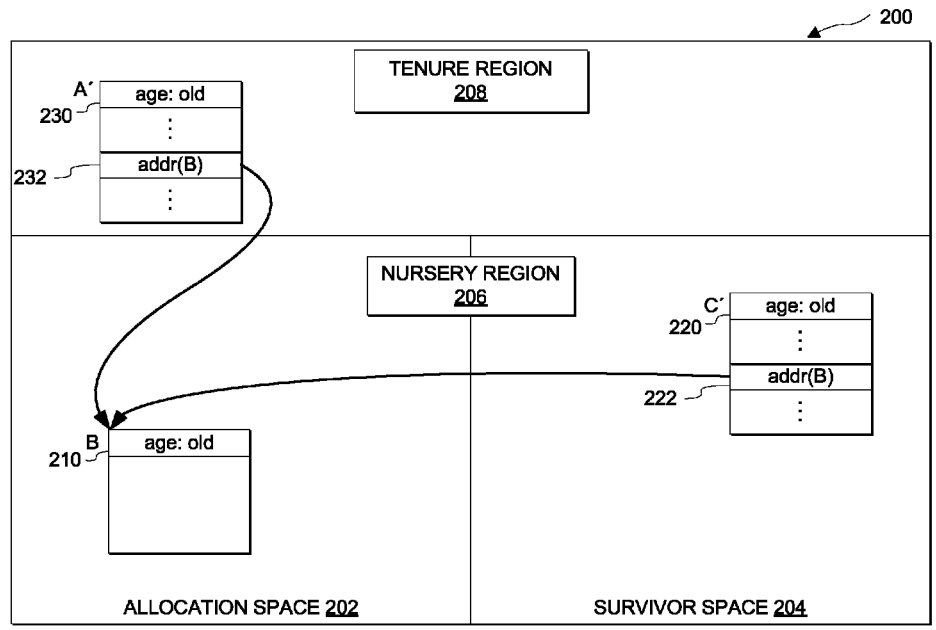
Figure 2D:
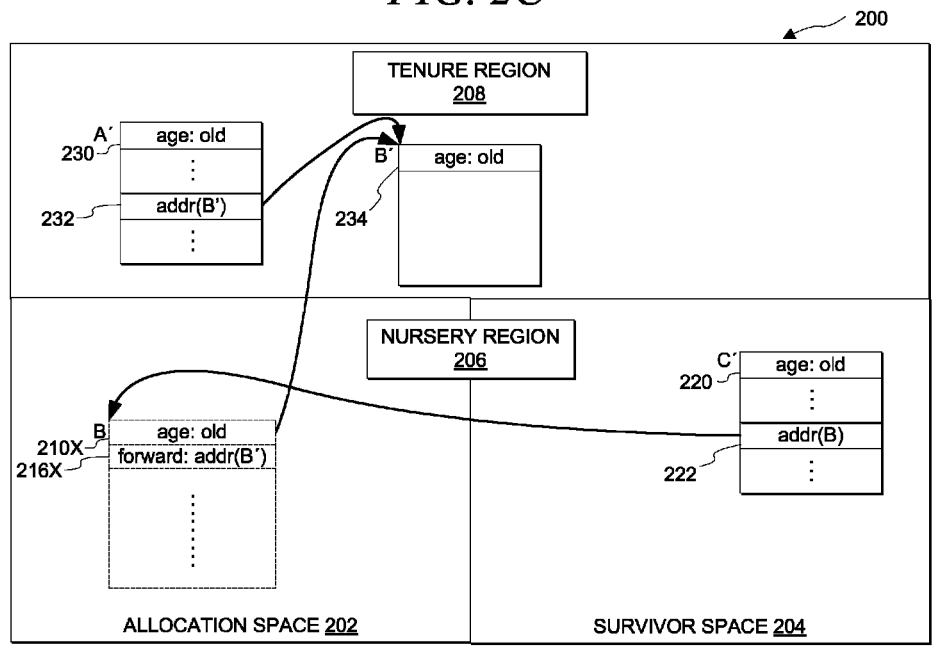

The garbage collection algorithm continues in FIG. 2C by copying old object A 212 of FIG. 2B to the tenure region 208 as object A' 230. The slots of object A' 230 are scanned and the objects referenced in the slots may be copied into the tenure region 208 if they are in the same age category as object A' 230. Object A' 230 includes a reference to object B 210 in allocate space 202. Object B 210 is an old object within the same age category as object A' 230 in the tenure region. Therefore, the algorithm may copy object B 210 to the same area as object A' 230. In FIG. 2D, object B 210 of FIG. 2C may be copied to the tenure region as object B' 234, and the reference in slot 232 in A' 230 updated to point to the newly copied object B' 234. However, object C' 220 in survivor space 204 still includes a reference to the former object B illustrated by dotted line B 210X in allocate space 202.

Figure 2E:
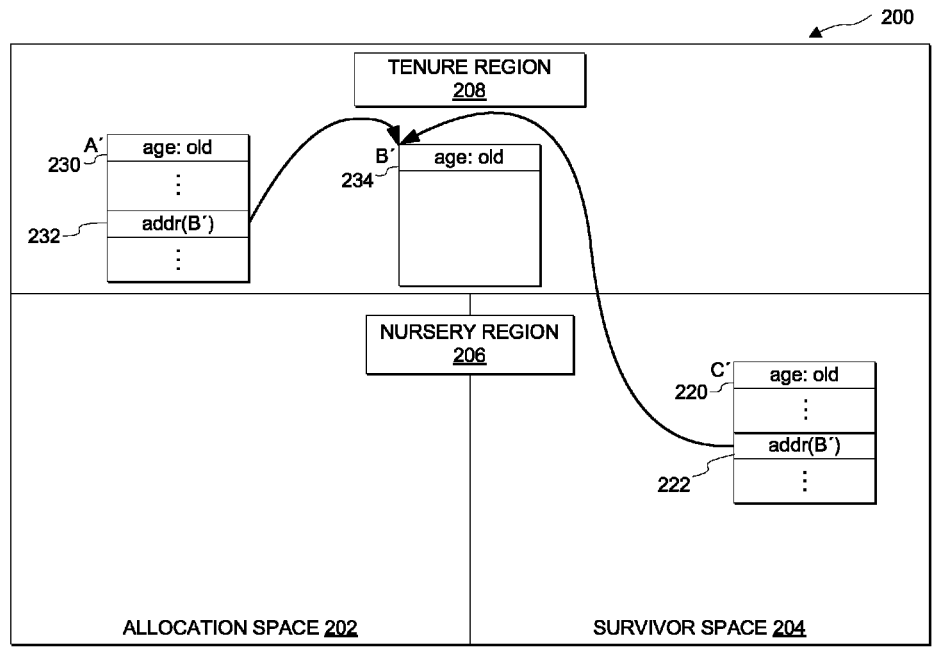

During the copying of B, the algorithm may leave behind, in the former object B 210X, a forwarding address 216X to its current location in the tenure region 208 as object B' 234. A thread may update the reference in slot 222 of object C' 220 to point to the current location of object B' 234 in tenure region 208 using the forwarding reference 216X. This may be done by "rescanning" object C' 220 at a later time. In one embodiment, FIG. 2E illustrates the updated references and locations of the objects. The young object, object C' 220 is located in the survivor space 204 of the nursery region 206 and includes a reference in slot 222 to the current location of object B' 234, located in tenure region 208. The objects that are part of the old generation, object A' 230 and object B' 234 are co-located in the tenure region 208. Object A' 230 includes a reference to object B' 234 in slot 232 of object A' 230.

Although both object C' 220 and object A' 230 reference object B' 234, object B' 234 may be optimally co-located with object A' 230 in the tenure region. Object C' 220 may have a short life and object B' 234 may continue to have a long life. Therefore, co-locating object B' 234 in the same space as object C' 220 would have limited usefulness. Deferring the copying of the child, object B 210, referenced in object C' 220, provided an opportunity to determine whether another object of the same generation as object B 210 exists and references object B 210. Object A' 230 also references object B' 234 and is within the same generation as object A' 230, therefore, it may be more optimum for object B' 234 to be co-located with object A' 230.

For exemplary purposes, FIG. 2 illustrates the operation of a single processor thread that performs the copying garbage collection operation in memory. Memory may include workpackets that function as scan blocks, copy blocks or perform a dual function of a scan block and a copy block. However, in another embodiment, the system may include a multi-threaded processor where the operations of scanning, copying and rescanning of objects being performed by the processor threads need to be synchronized.

For example, referring back to the process of FIG. 2E described earlier in the disclosure, object C' 220 may be rescanned at a later time to update the reference in slot 222 of object C' 220 to point to the current location of object B' 234 in tenure region 208 using the forwarding reference 216X. Therefore, object C' should be rescanned AFTER the object A' has been scanned. If object C' is rescanned BEFORE object A' is scanned, then deferring will not have had any effect.

In an embodiment where a single thread exists for a processor, the order of scanning and rescanning is definite. Rescanning may occur only after all scanning is completed. Therefore in the example of FIG. 2E, C' is only rescanned after A' is scanned. However, in an embodiment that includes multiple threads, the order of scanning and rescanning is not as definite. In one example, one or more threads may have completed scanning, and commenced rescanning, while the other threads continue scanning. It is possible that a rescanning thread may copy a separating child before the "scan" threads have had a chance to copy it more effectively. In order to prevent such a scenario, the threads may need to be synchronized so that at any one point in time either all the threads may be scanning, or all the threads may be rescanning. However, there may never be a mixture of threads scanning and threads rescanning.

Figure 3:
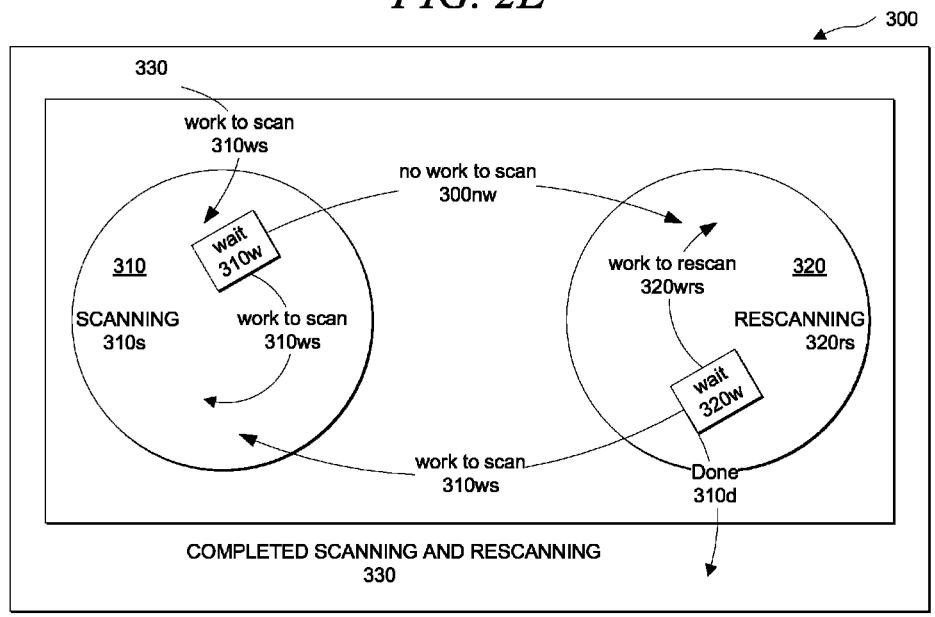
FIG. 3 illustrates processing state transitions for deferred separating children in accordance with an embodiment of the disclosure.

FIG. 3 illustrates a sequence 300 where multiple processor threads may synchronize to ensure that there is never a mixture of threads scanning and threads rescanning. Memory may contain multiple workpackets that are queued for scanning in a scanlist. The processor may divide up the work by assigning processor threads to process different workpackets on the scanlist. Sequence 300 shows process level states and their transitions, rather than the detailed thread level transitions which follow later. The process will be in one of four states: initial state 330, scanning state 310, rescanning state 320 and completed state 330. The initial state and completed state are identical.

When the process is in state 330, all threads must be in that state. When the process is in state scanning 310, all threads must be in thread state scanning 310s or state wait 310w. When the process is in state 320, all threads must be in thread state rescanning 320rs or state wait 320w. Initially, all threads in state 330 will receive a work-to-scan event 310ws and enter scanning state 310s. The threads of the processor may also exist in a wait state 310w and receive a work-to-scan event. The occurrence of a work-to-scan event 310ws, transitions that thread receiving the event from the wait state 310w to a scanning state 310s when the thread will start scanning a workpacket. A processor thread may continue in the scanning state 310s as long as that thread is processing a workpacket or can find an available workpacket to scan.

When a thread can no longer find available workpackets, it will enter the wait state 310w. Threads that are still scanning may produce new workpackets to scan, at which point they will signal work-to-scan events 310ws. This will cause threads that are in wait state 310w to enter scanning state 310s and start scanning again. Threads will alternate between scanning state 310s and wait state 310w. Eventually, the last active thread will complete the last available workpacket, at which point it will cause the no-work-to-scan event 300nw which triggers and activates the process level rescanning state 320. The active thread will transition itself and all the other threads which will all be in the wait state 310w to the rescanning state 320rs. The rescanning mode 320 remains active as long as at least one processor thread is rescanning a workpacket.

The processor threads may alternate between the rescanning state 320rs and wait state 320wrs while in this mode. During this process, new scan work may be generated. At which point all threads will transition back to the scan mode 310. The processor threads may cycle between the rescanning mode 320 and scanning mode 310 until there are no more workpackets to be scanned or rescanned and all the threads have completed processing. The completion of processing by all the processor threads activates the done event 310d which transitions the threads to the completed scanning and rescanning mode 330.

Figure 4A:
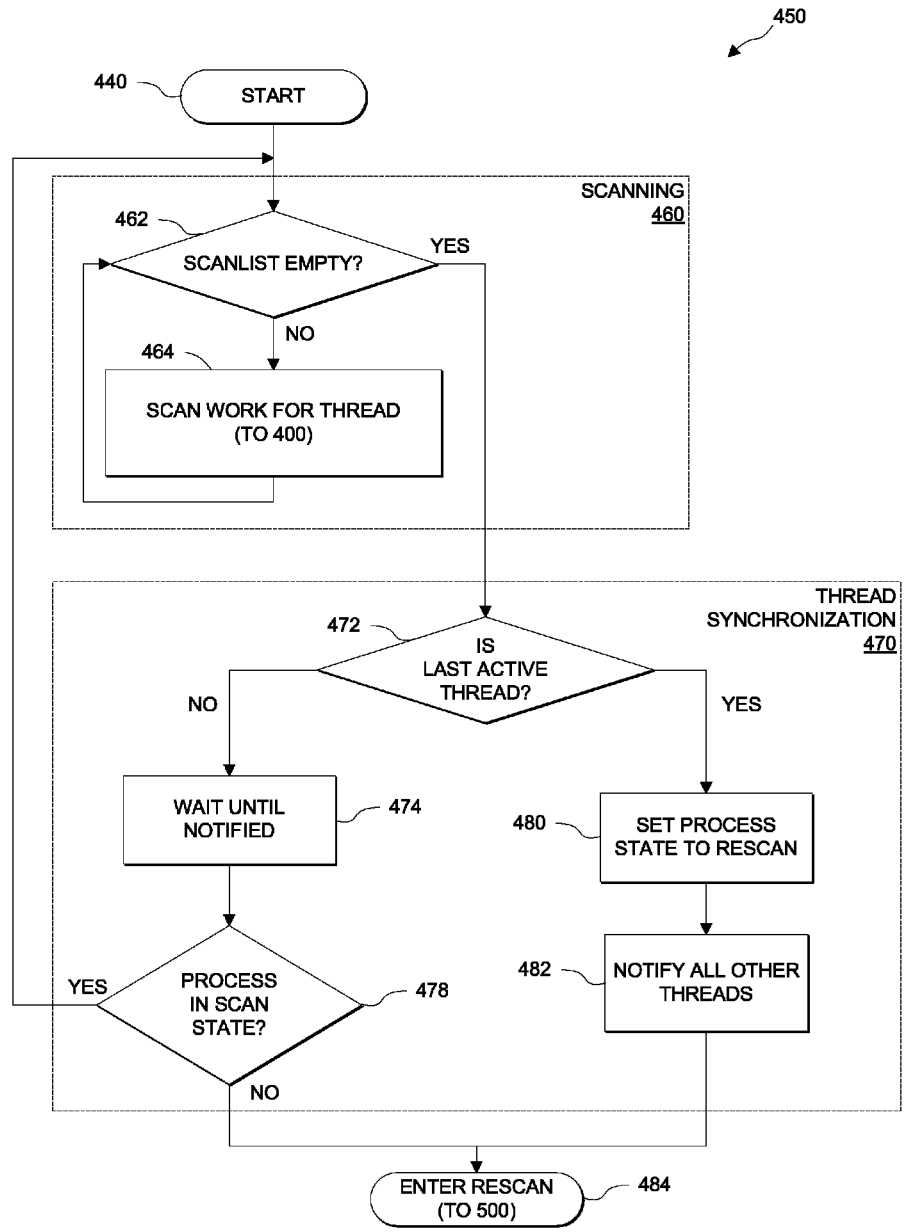
FIGS. 4A and 4B is a top level flowchart detailing the sequence of a processor thread during scanning according to an embodiment of the disclosure.
Figure 4B:
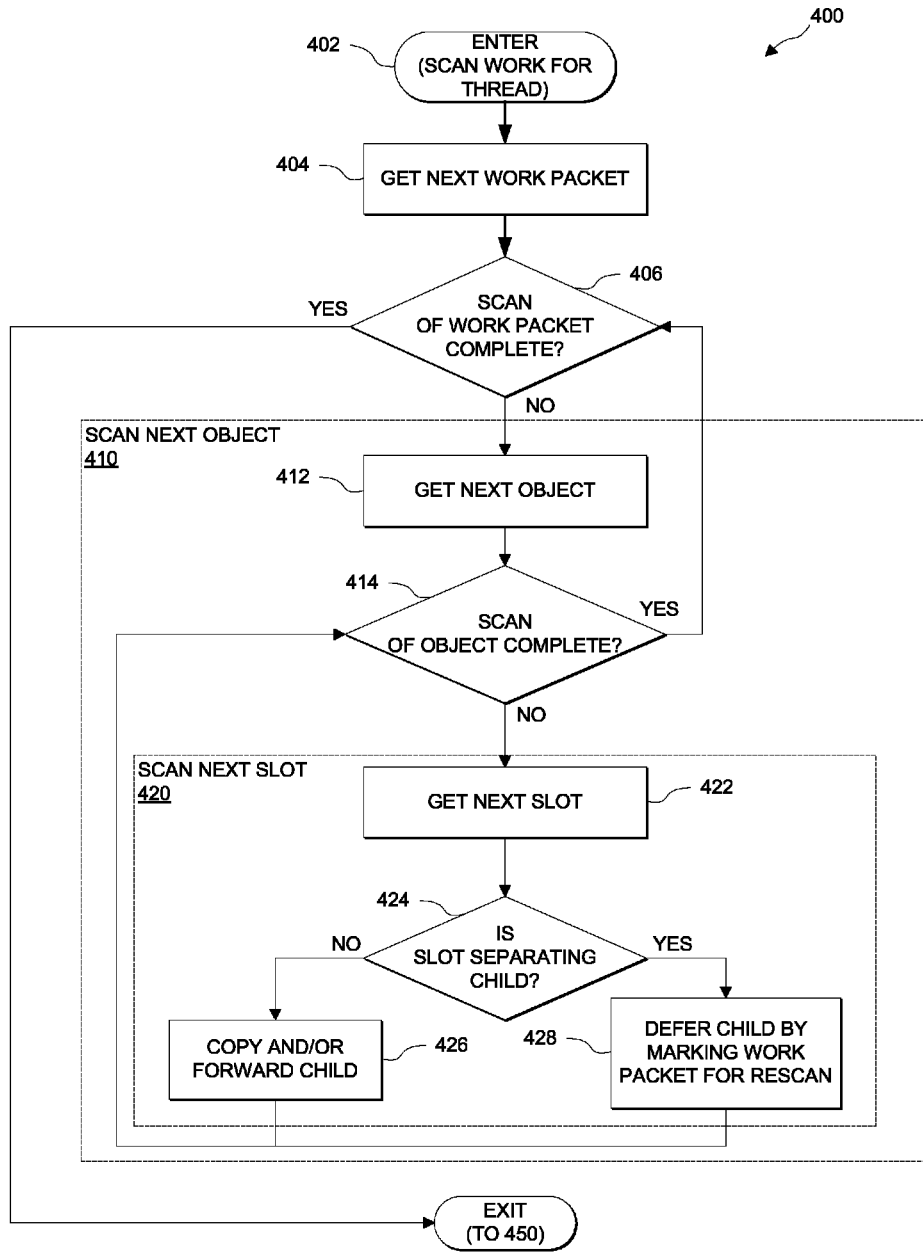

FIG. 4 provides details of the scanning mode shown in FIG. 3. In FIG. 4A, flowchart 450 illustrates a flow diagram for a processor thread that is scanning. In FIG. 4A, the processor thread checks if it has completed all the currently available work on the scanlist at a block 462. If all available work has not been completed, the processor thread scans work at block 464 by carrying out the process 400 of FIG. 4B, and will continue scanning work until the scanlist is empty. It must be noted that the scanlist may be shared between all threads and may contain all the work currently available to all the threads. If the thread can no longer find available work at 462, the processor thread enters the thread synchronization routine 470.

It is important to note that routine 470 may decide whether to wait in wait state 310w of FIG. 3 or whether to cause process state to become 320 via transition 300nw in FIG. 3. The thread checks if it is the last active thread at 472. If it is not the last active thread, then the thread will enter block 474 and immediately waits until notified. If the current thread is the last active thread, all other threads will be waiting to be notified at block 474. The last active thread has just determined that there is no work left to scan at block 462, and no other thread could have created work in the meantime. Thus, scanning has been completed, and the last active thread will change the shared process state from SCAN to RESCAN at a block 480. It will notify all other threads at a block 482, which will cause them to transition from idle to runnable, and all threads will enter rescanning at a block 484 which is the transition 300nw. Although it has not been shown, threads waiting to be notified at block 474 may also be notified by a thread that has created new work to be scanned while scanning work in routine 400. This will cause transition 310ws to occur and processing of workpackets on the scanlist may resume as the process state will still be in the SCAN state at block 478.

In FIG. 4B, flowchart 400 provides details of a processor thread scanning the next workpacket from the scanlist. A processor thread obtains the next workpacket at a block 404 and scans each object in the workpacket at routine 410. At the start of routine 410, the processor thread obtains the next object to be scanned at 412 and determines at block 414 whether the object has been scanned or if the scanning of the object is complete. The slots of the objects are scanned in routine 420.

The next slot that contains an object reference in the object is obtained at block 422 and it is determined at block 424 whether the slot contains a reference to an object that is a separating child. The object referenced in the slot is a separating child if it is in a different generation from the object being scanned. If it is determined at block 424 that the object referenced in the slot is not a separating child, at a block 426 the thread may copy the object to the survivor or tenure space if the object has not already been copied. However, if the object has already been copied by another thread or earlier by this thread, then that thread will have left behind a forwarding reference to the copied object. Regardless of whether or not the object is copied, the slot's reference will need to be updated to point to the copied object using the forwarding pointer for the child. If the object has just been copied by the current thread, then the thread will leave behind a forwarding reference to the new object, and places the forwarding reference in the old object.

If it is determined at a block 424 that the referenced object in the slot is a separating child, copying of the child is deferred at a block 428 and the workpacket is marked for rescan. The processor thread may continue scanning the slots of the object until it is determined at a block 414 that the scan of the object is complete. The processor thread determines at a block 406 whether the scan of all the objects in the workpacket is complete. The processor obtains and scans the next object in routine 410 until it is determined at a block 406 that the scan of the workpacket is complete. When a workpacket is completely scanned, the workpacket may no longer needed and it is placed on the freelist for reuse; the section of heap it referenced has been successfully processed. When the workpacket is ready to be reused it will reference a completely different block of memory.

It must be noted that FIG. 4B contains several simplifications. For example, during copy and/or forward child 426, the thread may copy objects into a copy block. If the current copy blocks are full, then a new workpacket may be taken from the freelist, made to reference an empty block of tenure or survivor space, marked as a copy block, and the object copied to the start of that block. The full copy block may be placed onto the scanlist if it contains work to be scanned. As a result, during the scanning of an object, additional work that needs to be scanned may be generated.

In another simplified scenario of FIG. 4B, a thread may determine, during the scanning of a workpacket, that another workpacket is a more optimum selection for scanning. As a result, the thread may defer the scanning of the current workpacket, and to scan the more optimum workpacket. Further details about this technique and hierarchical copying is detailed in U.S. patent application Ser. No. 11/450,946 to Siegwart et al., entitled "Locality With Parallel Hierarchical Copying Garbage Collection," filed Jun. 9, 2006, and incorporated herein for all purposes.

Figure 5A:
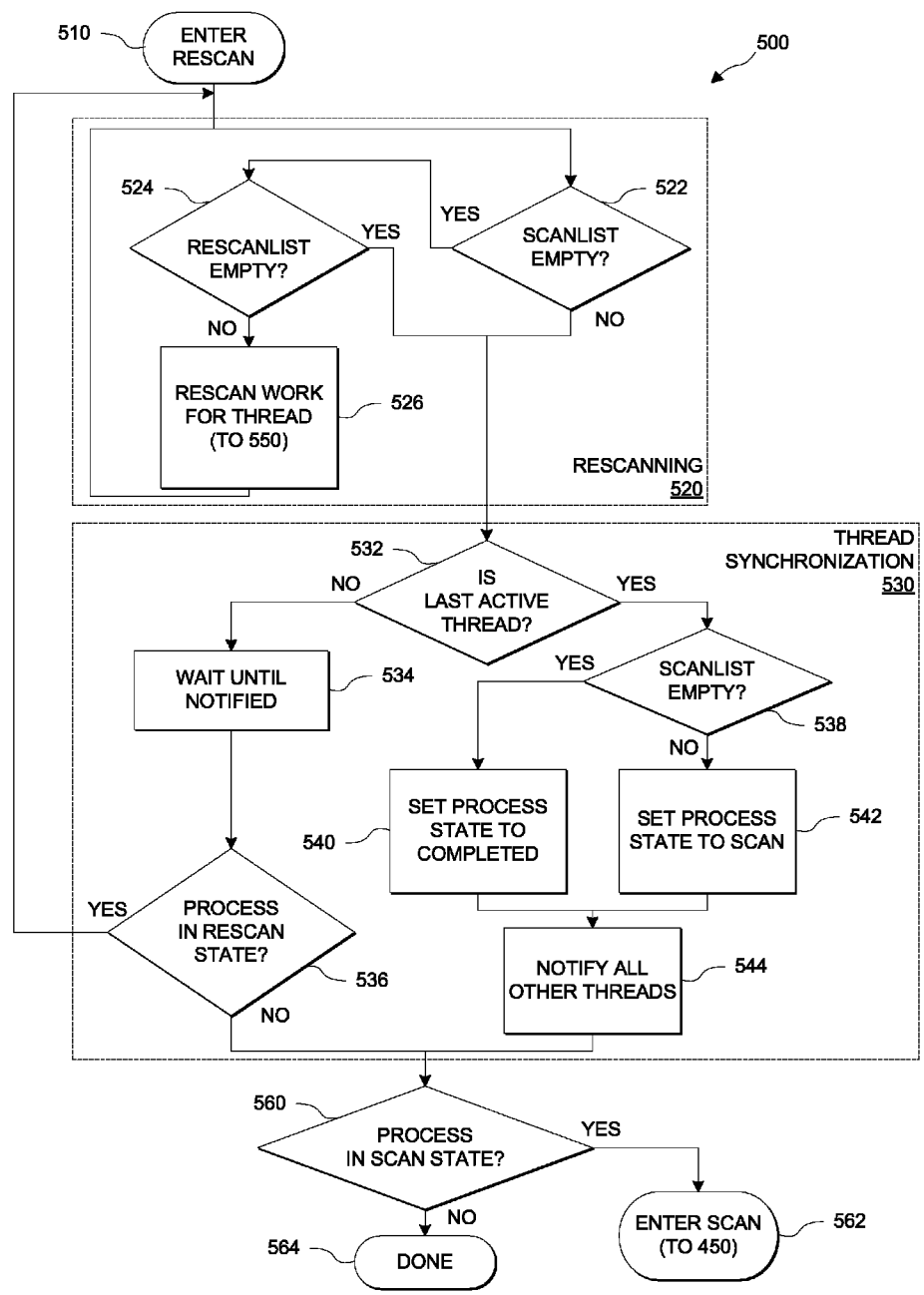
FIGS. 5A and 5B is a top level flowchart detailing the sequence of a processor thread during rescanning according to an embodiment of the disclosure.

FIG. 5 provides details of the rescanning mode. The processor threads may all be synchronized to enter the rescan mode. In FIG. 5A, flowchart 500 provides a flow diagram for a processor thread that is rescanning. At FIG. 5A, block 510, the processor threads enter the rescan mode. At a block 522, the scanlist is checked to determine whether workpackets are pending on the scanlist. At a block 524, it is determined whether the rescanlist has workpackets for processing. If the rescanlist has workpackets pending, then the workpackets are rescanned by the processor thread at block 526. At a block 524, it may be determined that the processor thread has completed all the work for rescanning. It may also be determined at a block 522, that work for scanning now exists or is ready for processing. The processor thread may then enter the thread synchronization routine 530 where it carries out a similar process to that of FIG. 4B routine 470. The thread checks that it is not the last active thread at 532, then waits until notified at a block 534. If the current thread is the last active thread then all other threads will be waiting at block 534. The last active thread may therefore determine that either there is no rescan work or there is new scan work available, and no other thread could have changed the scanlist or rescanlist in the meantime because all the threads were idle. The last active thread will therefore change the process state to SCAN depending on whether there is scan work available at a block 538 and a block 542.

If it is determined at a block 538 that there is no scan work available, then it will also been determined at block 524 that there is no rescan work available; rescanning and scanning will have been completed. The process state therefore becomes COMPLETED at a block 540. Regardless of whether the process state has been set to COMPLETED at block 540 or to SCAN at block 542, the last active thread will notify other threads all of which are waiting at block 534, and all threads will progress, respectively, to either a block 564 completing the process, or to a block 562 to continue scanning again at routine 450. As in the case of scanning, while there are still threads rescanning in routine 550, one such thread may create more work to be rescanned, and although not represented in the figures, the threads that are waiting at 534 may be notified by this thread. In such a case, the process state will still be RESCAN and threads that were waiting at a block 534 may be diverted to continue rescanning by a block 536. In rescanning the workpackets, a processor thread may scan any slots that need to be rescanned. A processor thread may also copy any separating children and update any slot references.

Figure 5B:
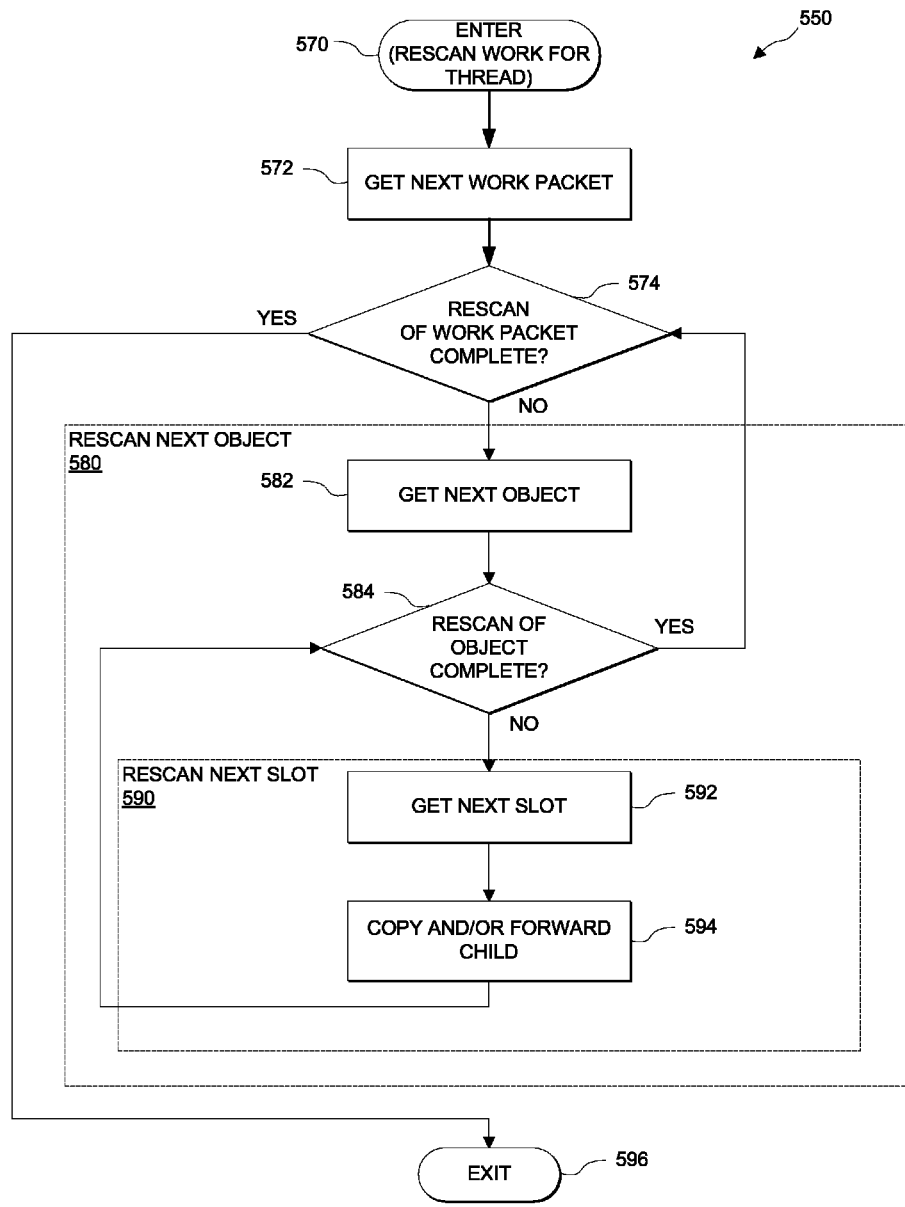

At FIG. 5B, flowchart 550 provides the details of the process of rescanning the workpackets of a thread. At a block 570, the process begins and the next workpacket in the rescanlist is obtained by the processor thread at a block 572. At a block 574, the processor thread determines whether the rescan of the workpacket is complete. If there are objects in the workpacket that are not yet rescanned, the processor thread gets the next object at a block 582, and proceeds with the rescanning of the object by iterating through blocks 584-594 until the rescan is complete. In rescanning the next object, the processor thread rescans each slot of the object and may copy and/or forward the child of each object at a block 594. The process iterates until it is determined at a block 584 that the rescan of each object in the workpacket is complete and additionally determined at a block 574 that the rescan of the workpacket is complete.

Figure 6:
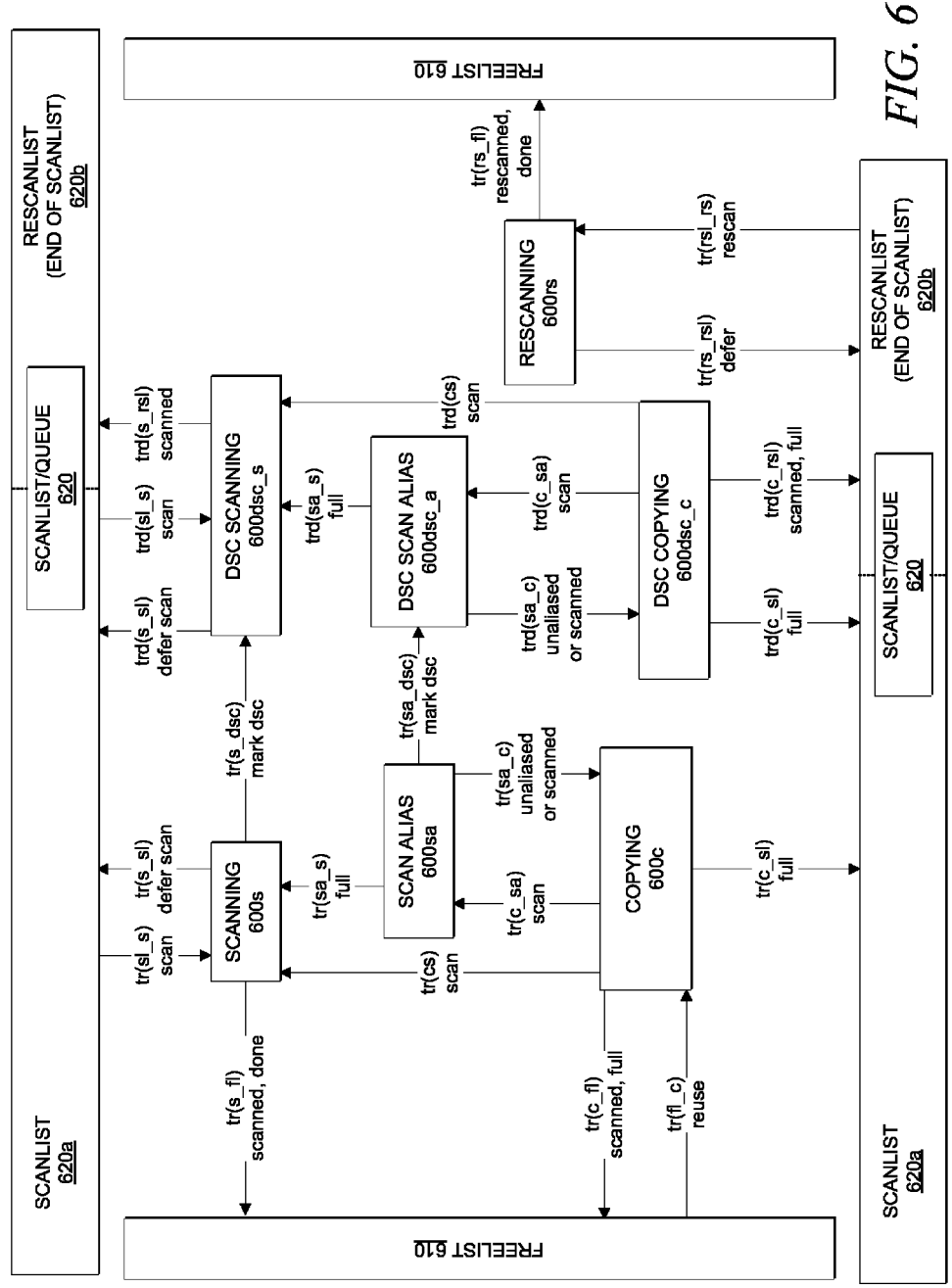
FIG. 6 is a state transition diagram illustrating the modes and transitions in a process for deferred separating children according to one embodiment of the disclosure.

FIG. 6 details the workpacket state transitions including deferred separating children and rescanning. A workpacket may be marked as having a deferred separating child or DSC while it is being scanned as a scan block 600s, or as a scan alias block 600sa, and then may transition to respective deferred scanning modes. In scan alias mode, a workpacket may transition at a tr(sa_dsc) to a deferred separating child (dsc) scan alias mode 600dsc_a. In scanning mode, a workpacket may transition at tr(s_dsc) to the dsc scanning mode 600dsc_s when it is determined that an object being scanned has a slot reference that is not within the same generation as the object being scanned. In the scanning states of scanning 600s and scan alias 600sa, workpackets may transition to a deferred scanning at 600dsc_s and 600dsc_sa, respectively when the workpacket is marked as having a deferred separating child.

An indication of a deferred separating child infers that the workpacket will need rescanning, and when it has been completely scanned the workpacket may be transitioned at trd (s_rsl) to the end of the scanlist queue 620b for rescanning. When objects need to be copied into a new block of memory in the survivor or tenure region, a workpacket in a freelist is transitioned at tr(fl_c) from the freelist to become a copy block and set up to refer to the new empty block of memory.

Objects are copied into this space when the workpacket or copy block is in a copying mode 600c. At some point during the copying of objects into the copy block it may transition at tr(c_sa) to scan alias mode 600sa and a thread will begin scanning the objects already copied into the copy block during copying mode 600c. The scanning of the objects in the copy block may continue simultaneously with additional objects being copied into the copy block during scan alias mode 600sa. The scan alias block or workpacket may become full of objects so that there is no more room for objects to be copied into it, and the workpacket may transition at tr(sa_s) to a scanning mode 600s only. A thread may complete the scanning of objects in a workpacket in scanning mode 600s and the workpacket may transition at tr(s_fl) to the freelist 610 for immediate reuse. It is also possible that a thread may defer the scanning of the scan block and transition the workpacket at tr(s_sl) to the scanlist 620a for scanning at a later time.

In one embodiment, a possible state transition involving a separating child may be indicated as follows: A workpacket may be in a scanning and copying mode at scan alias 600sa without having encountered a separating child. At some point, the workpacket may encounter a separating child. The workpacket will be tagged as having a deferred separating child and the slot with the separating child will be skipped. The workpacket transitions at tr(sa_dsc) to a mode dsc scan alias 600dsc_a that indicates rescanning will be required. In dsc scan alias 600dsc_a mode, a thread may continue scanning of objects in and copying objects into the workpacket after the deferred slot has been skipped. The workpacket may not be full but scanning may be completed or scanning be may deferred and the workpacket may transition at trd(sa_c) to a copying mode 600dsc_c. The workpacket may also re-transition at trd(c_sa) to an aliasing mode at 600dsc_a.

The workpacket may become full of objects and transition at trd(sa_s) to a dsc scanning 600dsc_s mode only. A thread may also defer scanning of a workpacket, the workpacket transitioning at trd(s_sl) to scanlist 620a. Reasons to defer the scanning of workpackets are detailed in U.S. patent application Ser. No. 11/450,946 to Siegwart et al., entitled "Locality With Parallel Hierarchical Copying Garbage Collection," filed Jun. 9, 2006 and incorporated herein for all purposes. It must be emphasized that deferring workpackets is not synonymous with deferring separating children.

The workpacket may also be scanned and full and need to be rescanned so the workpacket transitions at trd(s_rsl) to the end of the scanlist at 620b. Eventually a thread will transition the workpacket at tr(rsl_rs) to a rescanning mode 600rs. The workpacket may then be rescanned and freed by transitioning at tr(rs_fl) to freelist 610. Also rescanning may be interrupted and the workpacket deferred and placed back onto the end of the scanlist at 620b by transitioning at tr(rs_rsl).

Table 1 provides definitions for pseudo-code that expresses the state transitions for a deferred separating child and defines a separating child as a mathematical function. The following definitions may be applicable to the pseudo-code of Table 1:

TABLE 1

DEFINITIONS IN SEPARATING CHILD FUNCTION $$\text{isToBeFlipped}(x) = \begin{cases} \text{true} & \text{if object x is about to be flipped, based on its tenure age} \\ \text{false} & \text{otherwise} \end{cases}$$

$$\text{isObjectInSurvivorSpace}(x) = \begin{cases} \text{true} & \text{if the object x is in the survivor space} \\ \text{false} & \text{otherwise} \end{cases}$$

$$\text{isObjectInAllocateSpace}(x) = \begin{cases} \text{true} & \text{if object x is in the allocate space, ready to be evacuated} \\ \text{false} & \text{otherwise} \end{cases}$$

$$\text{ifForwarded}(x) = \begin{cases} \text{true} & \text{if object x has been forwarded} \\ \text{false} & \text{otherwise} \end{cases}$$

Table 2, illustrated below provides definitions for pseudocode that expresses the state transitions for a deferred separating child and defines a separating child as a mathematical function.

TABLE 2

MATHEMATICAL FUNCTION IN SEPARATING CHILD $$\text{isSeparatingChild}(\text{parent, child}) =$$

$$\begin{cases} \text{false} & \text{if child} = \emptyset \text{ or isObjectInAllocateSpace (child)} \\ & = \text{false or isForwarded (child)} \\ & = \text{true} \\ \text{otherwise} & \begin{cases} \text{true if is ToBeFlipped(child)} \neq \text{isObjectInSurvivorSpace(parent)} \\ \text{false if is ToBeFlipped(child)} = \text{isObjectInSurvivorSpace(parent)} \end{cases} \end{cases}$$

In Table 2, shown above, the mathematical function for the separating child evaluates to true if the parent is to be separated from the child, with either the child being tenured and the parent flipped, or the child being flipped and the parent tenured.

In other embodiments, a slot may be deferred for other reasons than for deferred separating children. For example, there are cases where a child object may not be used frequently. In such cases, the scanning of a slot may be deferred to avoid copying the child close to the parent because the child is not used frequently and would consume space that may be used by another object or child.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product comprising a computer-usable or computer-readable medium tangibly embodying program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, semiconductor system, apparatus or device. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing garbage collection of memory in a heap of a functional programming language, the method comprising:
   identifying, by a processor, a parent object located in a first region of memory in the heap for objects that have been accessed in a predetermined time period and therefore recently used, wherein the parent object comprises references to objects;
   subsequent to scanning, by the processor, the references of the parent object, identifying, by the processor, a reference to a child object in the references of a the parent object, wherein the child object is also located in the first region of memory in the heap for objects that have been recently used;
   determining, by the processor, whether the parent object has been recently used and whether the child object has been recently used; and
   responsive to a determination that the parent object has been recently used and a determination that the child object has not been recently used, deferring, by the processor, a copying of the child object to a second region of memory in the heap for objects that have not been recently used and marking, by the processor, the parent object as an object to be rescanned at a later time, wherein deferring the copying prevents the child object from becoming separated from a close locality of a same memory space, including a same cache line or a cache page with the parent object.

2. The method of claim 1 wherein the reference to the child object is a first reference to the child object, and further comprising:
   identifying, by the processor, another object located in the second region of memory in the heap for objects that have not been recently used, wherein the another object comprises references to objects;
   subsequent to scanning, by the processor, the references of the another object, identifying, by the processor, a second reference to the child object in the references of the another object;
   determining, by the processor, whether the another object has been recently used; and
   responsive to identifying the second reference to the child object in the references of the another object and a determination that the another object and the child object have both not been recently used, copying, by the processor, the child object to the second region of memory in the heap for objects that have not been recently used.

3. The method of claim 2, further comprising:
   responsive to identifying the second reference to the child object in the references of the another object and the determination that the another object and the child object have both not been recently used, modifying, by the processor, the child object to include a forwarding reference to the copy of the child object located in the region of memory in the heap for objects that have not been recently used.

4. A memory management system comprising:
   a bus, a processor unit, and a computer readable storage device;
   first program code to identify a parent object located in a first region of memory in a heap of a functional programming language for objects that have been accessed in a predetermined time period and therefore recently used, wherein the parent object comprises references to objects;
   second program code, subsequent to scanning the references of the parent object, to identify a reference to a child object in the references of a the parent object, wherein the child object is also located in the first region of memory in the heap for objects that have been recently used;
   third program code to determine whether the parent object has been recently used and whether the child object has recently used; and
   fourth program code, responsive to a determination that the parent object has been recently used and a determination that the child object has not been recently used, to defer a copying of the child object to a second region of memory in the heap for objects that have not been recently used and mark the parent object as an object to be rescanned at a later time, wherein deferring the copying prevents the child object from becoming separated from a close locality of a same memory space, including a same cache line or a cache page with the parent object, and wherein the first program code, the second program code, the third program code, and the fourth program code are stored in the computer readable storage device for execution by the processor unit via the memory.

5. The memory management system of claim 4 wherein the reference to the child object is a first reference to the child object, and further comprising:
   fifth program code to identify another object located in the second region of memory in the heap for objects that have not been recently used, wherein the another object comprises references to objects;
   sixth program code, subsequent to scanning the references of the another object, to identify a second reference to the child object in the references of the another object;
   seventh program code to determine whether the another object has been recently used; and
   eighth program code, responsive to identifying the second reference to the child object in the references of the another object and a determination that the another object and the child object have both not been recently used, to copy the child object to the second region of memory in the heap for objects that have not been recently used, wherein the fifth program code, the sixth program code, the seventh program code, and the eighth program code are stored in the computer readable storage device for execution by the processor unit via the memory.

6. The memory management system of claim 5, further comprising:
ninth program code, responsive to identifying the second reference to the child object in the references of the another object and the determination that the another object and the child object have both not been recently used, to modify the child object to include a forwarding reference to the copy of the child object located in the region of memory in the heap for objects that have not been recently used, wherein the ninth program code is stored in the computer readable storage device for execution by the processor unit via the memory.

7. A computer program product for managing garbage collection of memory in a heap of a functional programming language, the computer program product comprising:
a computer readable storage device;
program code, stored on the computer readable storage device, for identifying a parent object located in a first region of memory in the heap for objects that have been accessed in a predetermined time period and therefore recently used, wherein the parent object comprises references to objects;
program code, stored on the computer readable storage device, subsequent to scanning the references of the parent object, for identifying a reference to a child object in the references of a the parent object, wherein the child object is also located in the first region of memory in the heap for objects that have been recently used;
program code, stored on the computer readable storage device, for determining whether the parent object has been recently used and whether the child object has recently used; and
program code, stored on the computer readable storage device, responsive to a determination that the parent object has been recently used and a determination that the child object has not been recently used, for deferring a copying of the child object to a second region of memory in the heap for objects that have not been recently used and marking the parent object as an object to be rescanned at a later time, wherein deferring the copying prevents the child object from becoming separated from a close locality of a same memory space, including a same cache line or a cache page with the parent object.

8. The computer program product of claim 7 wherein the reference to the child object is a first reference to the child object, and further comprising:
program code, stored on the computer readable storage device, for identifying another object located in the second region of memory in the heap for objects that have not been recently used, wherein the another object comprises references to objects;
program code, stored on the computer readable storage device, subsequent to scanning the references of the another object, for identifying a second reference to the child object in the references of the another object;
program code, stored on the computer readable storage device, for determining whether the another object has been recently used; and
program code, stored on the computer readable storage device, responsive to identifying the second reference to the child object in the references of the another object and a determination that the another object and the child object have both not been recently used, for copying the child object to the second region of memory in the heap for objects that have not been recently used.

9. The computer program product of claim 8, further comprising:
program code, stored on the computer readable storage device, responsive to identifying the second reference to the child object in the references of the another object and the determination that the another object and the child object have both not been recently used, for modifying the child object to include a forwarding reference to the copy of the child object located in the region of memory in the heap for objects that have not been recently used.

* * * * *